US010985545B2

(12) United States Patent
Odille

(10) Patent No.: US 10,985,545 B2
(45) Date of Patent: Apr. 20, 2021

(54) ELECTRICAL SWITCHING DEVICE AND ASSOCIATED CONFIGURATION AND DIAGNOSTIC METHODS

(71) Applicant: Schneider Electric Industries SAS, Rueil Malmaison (FR)

(72) Inventor: Fabien Odille, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 259 days.

(21) Appl. No.: 16/105,197

(22) Filed: Aug. 20, 2018

(65) Prior Publication Data

US 2019/0074680 A1    Mar. 7, 2019

(30) Foreign Application Priority Data

Sep. 5, 2017   (FR) ..................................... 17 58182

(51) Int. Cl.
| | |
|---|---|
| *H01H 71/74* | (2006.01) |
| *H02H 3/00* | (2006.01) |
| *H02H 1/00* | (2006.01) |
| *H02H 1/06* | (2006.01) |
| *H01H 71/00* | (2006.01) |
| *H02H 3/08* | (2006.01) |

(52) U.S. Cl.
CPC ............ *H02H 3/006* (2013.01); *H01H 71/74* (2013.01); *H02H 1/0007* (2013.01);
(Continued)

(58) Field of Classification Search
CPC .......... H02H 3/006; H02H 1/06; H02H 1/063; H02H 1/066; H02H 3/08; H02H 3/083;
(Continued)

(56) References Cited

U.S. PATENT DOCUMENTS

| 4,419,737 A | * | 12/1983 | Yamaura | ................ | H02H 3/006 |
| | | | | | 713/500 |
| 2005/0267898 A1 | * | 12/2005 | Simon | .................... | G06Q 10/00 |

(Continued)

FOREIGN PATENT DOCUMENTS

| DE | 20 2016 102 436 U1 | 11/2016 |
| EP | 2 110 916 A2 | 10/2009 |

OTHER PUBLICATIONS

Machine Translation of description of DE202016102436U1 from EPO translation tool Espacenet, 8 pages, 2020 (Year: 2020).*

(Continued)

*Primary Examiner* — Harry R Behm
(74) *Attorney, Agent, or Firm* — Oblon, McClelland, Maier & Neustadt, L.L.P.

(57) ABSTRACT

A switching device includes two connection lands, a measurement device for measuring a first quantity of a current flowing between the two lands, a power supply system and a trigger module, the latter including a first driver module for detecting an electrical fault according to first values stored in a first memory and controlling a switching member; a communication module for receiving and storing second values in a second, non-volatile memory; and a second driver module for replacing the first values with the second values in the first memory. The first driver module compares a second quantity of the first supply current with a threshold and controls the supply of power to the second driver module if the second value is higher than or equal to the threshold.

16 Claims, 4 Drawing Sheets

Figure 1:
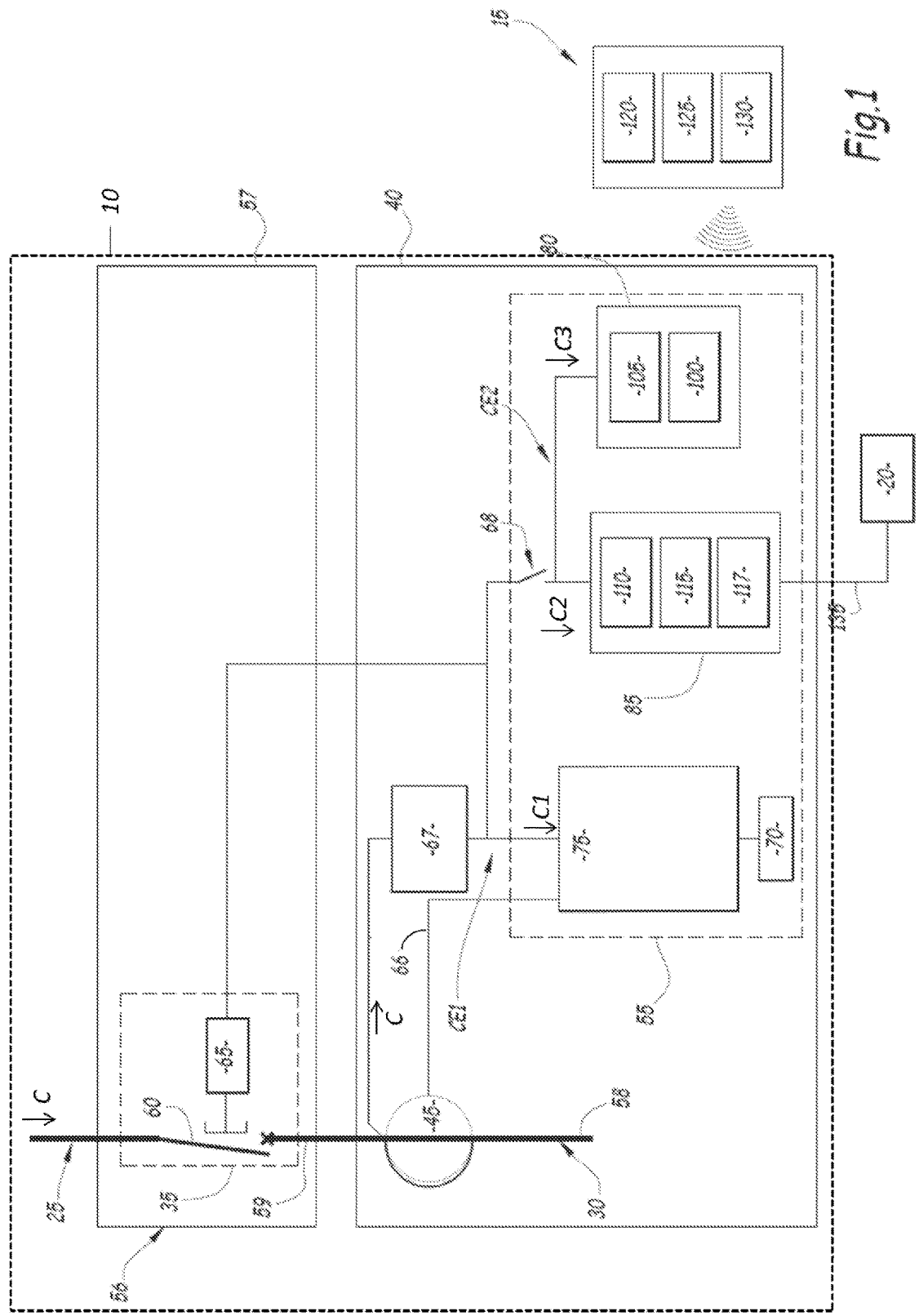

(52) U.S. Cl.
CPC ........ *H02H 1/0053* (2013.01); *H02H 1/0061* (2013.01); *H02H 1/06* (2013.01); *H01H 2071/006* (2013.01); *H02H 3/083* (2013.01)

(58) Field of Classification Search
CPC .. H02H 1/0053; H02H 1/0061; H02H 1/0007; H01H 71/74; H01H 2071/006
See application file for complete search history.

(56) References Cited

U.S. PATENT DOCUMENTS

| | | |
|---|---|---|
| 2009/0257160 A1 | 10/2009 | Vicente et al. |
| 2010/0259862 A1* | 10/2010 | Veil ............... H01H 47/002 361/160 |
| 2012/0287543 A1* | 11/2012 | Schlotterer ............ H02H 3/006 361/93.2 |
| 2013/0148249 A1 | 6/2013 | Schlotterer et al. |
| 2013/0329331 A1* | 12/2013 | Erger ................. H01H 9/168 361/102 |
| 2015/0270083 A1* | 9/2015 | Masseboeuf ............. H02H 3/04 361/93.2 |

OTHER PUBLICATIONS

French Preliminary Search Report dated Apr. 26, 2018 in French Application 17 58182 filed on Sep. 5, 2017 (with English Translation of Categories of Cited Documents and Written Opinion).

* cited by examiner

ELECTRICAL SWITCHING DEVICE AND ASSOCIATED CONFIGURATION AND DIAGNOSTIC METHODS The present invention relates to an electrical switching device. The present invention also relates to a method for configuring an electrical switching device, and a method for diagnosing the nature of an electrical fault.

Electrical switching devices are frequently used for electrical installation protection applications. Such switching devices, such as breakers, are configured for interrupting an electrical current in the case of detection of an anomaly. In particular, these switching devices generally comprise a device for measuring the electrical current and a driver module designed to detect an anomaly based on the measurement of the current and to control, in response, the interruption of the current.

In domestic installations, a simple measurement of the intensity of the current allows the current to be interrupted in the case of a short-circuit.

However, in industrial installations, the parameters of the current to be analyzed are often complex, in order to detect not only short-circuits but other types of faults specific to the installation. For example, an installation comprising three-phase motors will be equipped with breakers able to detect a temperature rise of the installation, a phase unbalance, or again a blocking or too long a start-up of the motor linked to mechanical problems.

Thus, the switching devices provided for industrial installations require a more complex adjustment, involving numerous parameters.

In order to enable the adjustment of these parameters by an operator, there exist breakers onto which it is possible to connect a communications module allowing an operator to adjust a large number of parameters of the circuit breaker without it being necessary to provide bulky adjustment means, such as buttons corresponding to each parameter, on one face of the circuit breaker.

However, the presence of such a communications module leads to an increase in complexity of the driver module, which has to manage the transfer of information with the communications module. yet, such an increase in complexity increases the consumption of the driver module. The switching device is therefore likely not to be able to correctly ensure the interruption of the current if the supply of electrical power available is too weak.

The aim of the invention is to provide a switching device that is rendered safe and secure in a satisfactory manner.

For this purpose, one subject of the invention is an electrical switching device comprising at least two connection lands, a measurement device configured for measuring a first electrical quantity of an electrical current flowing between the two connection lands, an electrical power supply system designed to deliver a first electrical power supply current, a trigger module and a switching member able to switch between a first position electrically connecting the two connection lands and a second position in which the two connection lands are electrically disconnected from one another, the trigger module comprising:

a first memory for storing first values of detection parameters,
a first driver module configured for detecting an electrical fault as a function at least of values measured by the measurement device and of the first stored values and for generating in response a switching signal for the switching member, and a communications module comprising a second non-volatile memory, the communications module being configured for receiving, via radiofrequency communication, a configuration signal containing second values of the detection parameters and for storing the second values received in the second memory, the electrical switching device being characterized in that:
the trigger module furthermore comprises a second driver module configured for replacing the first values in the first memory by the second values, and
the first driver module is configured for comparing a second electrical quantity of the first electrical power supply current with a threshold and for controlling the supply of electrical power to the second driver module if the electrical quantity is greater than or equal to the threshold.

According to particular embodiments, the switching device has one or more of following optional features, taken in isolation or according to all the technically possible combinations:

the first memory is a non-volatile memory;
the second driver module is configured for comparing the second values stored in the second memory with at least one range of allowed values, and for substituting, in the first memory, the second values for the first values only if the second values belong to a range of allowed values;
the first driver module is configured for, following the detection of a fault, transmitting data identifying the fault detected to the second driver module, the second driver module being configured for writing the identification data into the second memory;
the first driver module is configured for, following the detection of a fault, transmitting to the second driver module an alarm signal warning that an interruption of the supply of electrical power to the second driver module will take place, the second driver module comprising a device for storing electrical energy configured for electrically supplying the second driver module from the receipt of the alarm signal until the writing of the identification data into the second memory;
the communications module is configured for generating, from the configuration signal, a second current supplying electrical power to the communications module;
the second driver module is configured for, following a recovery of the supply of electrical power to the second driver module after a period of time during which the second driver module was not electrically powered:
consulting the second memory, and
if second parameter values have been stored in the second memory for the period of time during which the second driver module was not powered, replacing the first values in the first memory by the second values;
the second driver module is furthermore configured for receiving, via a wired link, third values of the detection parameters coming from a configuration device separate from the electrical switching device and for replacing, in the first memory and/or in the second memory, the first values and/or the second values by the received third values;
the electrical power supply system comprises current transformers designed to generate the first electrical current starting from at least one electrical current flowing between the two connection lands; and the electrical switching device comprises a triggering device and a circuit breaker, the triggering device comprising a housing accommodating the trigger module, the circuit breaker comprising a housing accommodating the switching member, the housings for the triggering device and for the circuit breaker being distinct from one another.

Another subject of the invention is a method for configuring a switching device comprising at least two connection lands, a measurement device configured for measuring an electrical quantity of an electrical current flowing between the two connection lands, an electrical power supply system designed to deliver a first electrical power supply current, a trigger module and a switching member designed to switch between a first position electrically connecting the two connection lands and a second position in which the two connection lands are electrically disconnected from one another, the trigger module comprising:

- a first memory in which first values of detection parameters are stored,
- a first driver module configured for detecting an electrical fault as a function at least of values measured by the measurement device and of the first stored values and for generating, in response, a switching signal for the switching member,
- a communications module comprising a second non-volatile memory, and
- a second driver module, the method comprising steps for:
- receiving second values of the detection parameters, via radiofrequency communications, by the communications module,
- storing of the second values in the second memory,
- comparison, by the first driver module, of a second electrical quantity of the first electrical power supply current with a threshold, and
- if the second electrical quantity is greater than or equal to the threshold, control, by the first driver module, of the supply of electrical power to the second driver module and replacement, in the first memory, by the second driver module, of the first values by the second values.

According to particular embodiments, the configuration method has one or more of the following optional features, taken in isolation or according to all the technically possible combinations:

- the method furthermore comprises, if the second electrical quantity is strictly less than the threshold, the absence of the supply of electrical power to the second driver module and the wait for the second electrical quantity to be greater than the threshold;
- the method furthermore comprises steps for
  - receipt, by the second driver module, via a wired link, of third values of the detection parameters,
  - replacement, in the second memory, of the second values by the third values, and
  - replacement, in the first memory, of the first values by the third values;
- the method furthermore comprises a step for comparison, by the second driver module, of the second values stored in the second memory with at least one range of allowed values, the step for replacement, in the first memory, by the second driver module, of the first values by the second values being implemented only if the second values belong to a range of allowed values.

Yet another subject of the invention is a method for diagnosing the nature of an electrical fault, comprising steps for:

- implementing a configuration method such as defined hereinabove,
- detection, by the first driver module, of an electrical fault,
- control, by the first driver module, of an interruption, by the switching member, of the electrical current flowing between the two connection lands,
- generation, by the first driver module, of data identifying the electrical fault,
- transmission of the identification data to the second driver module, and
- writing identification data in the second memory, and
- transmission, by the communications module, of a radiofrequency identification signal comprising the identification data.

According to particular embodiments, the diagnostic method has one or more of the following optional features, taken in isolation or according to all the technically possible combinations:

- the method furthermore comprises a step for emission, by a mobile device, of a radiofrequency signal causing the generation, by an antenna of the communications module, of a current supplying electrical power to the communications module; and
- the second driver module is electrically powered, during the steps for current interruption, for transmission of the identification data and for writing in memory, by an electrical current generated by a device for storing electrical energy.

Figure 2:
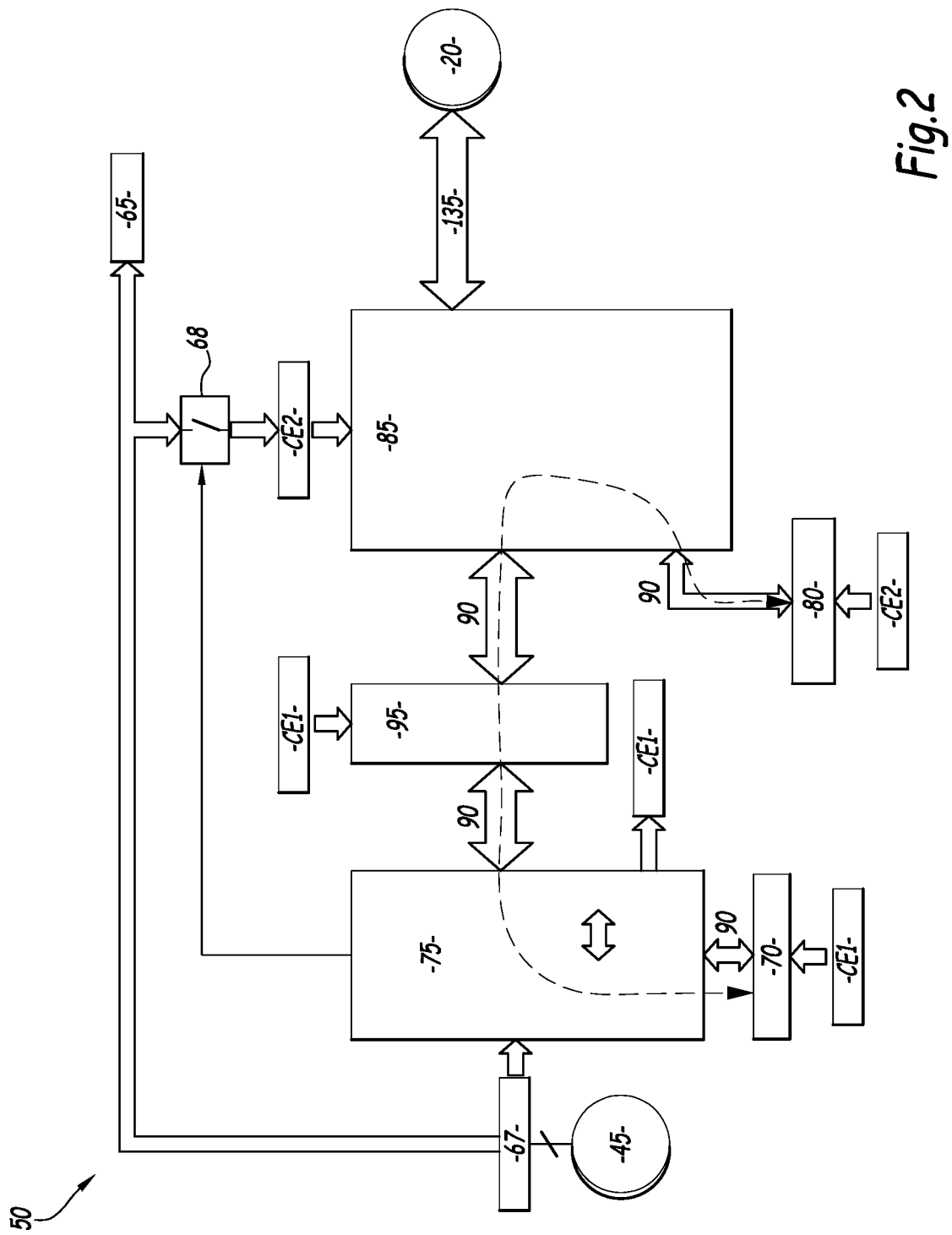
Figure 3:
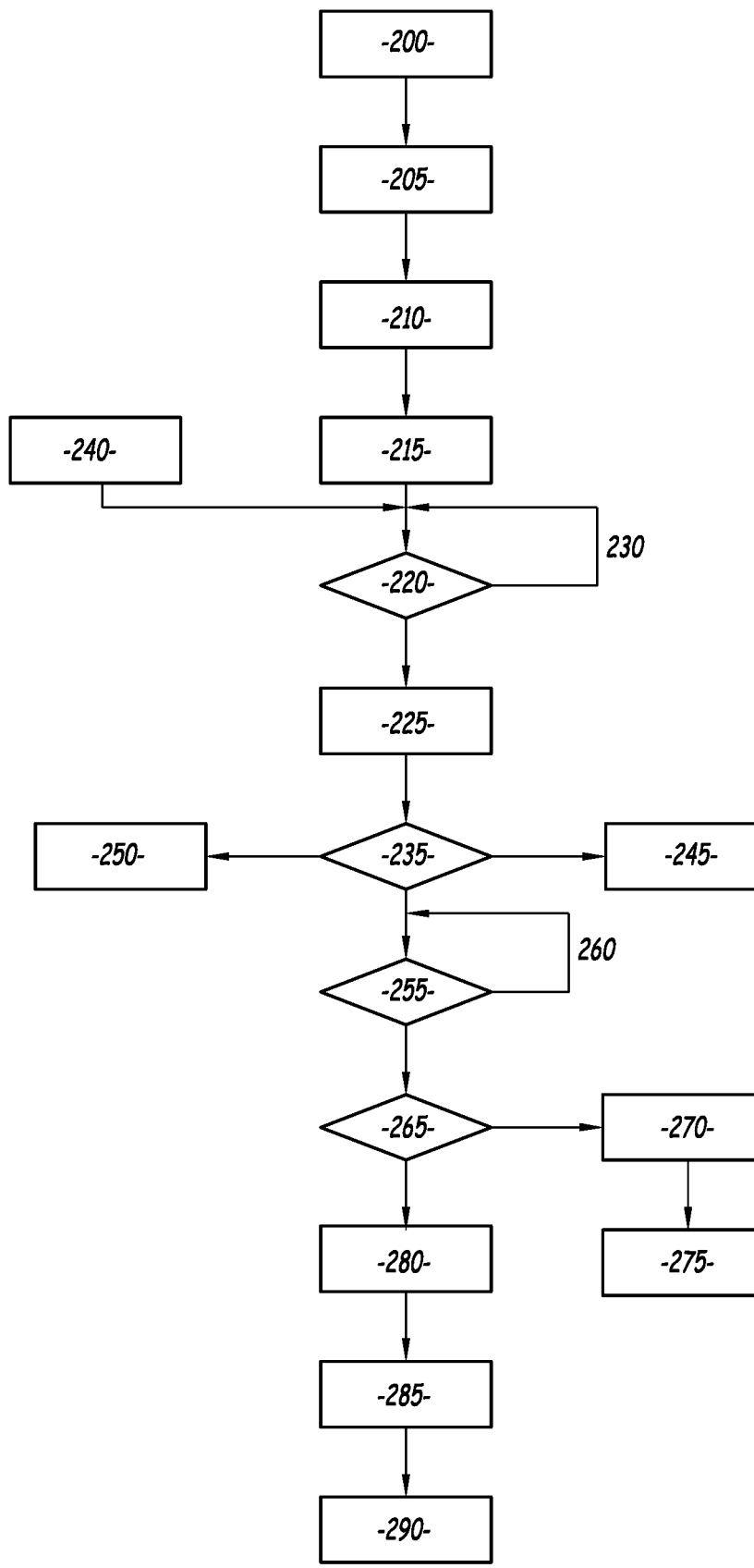
Figure 4:
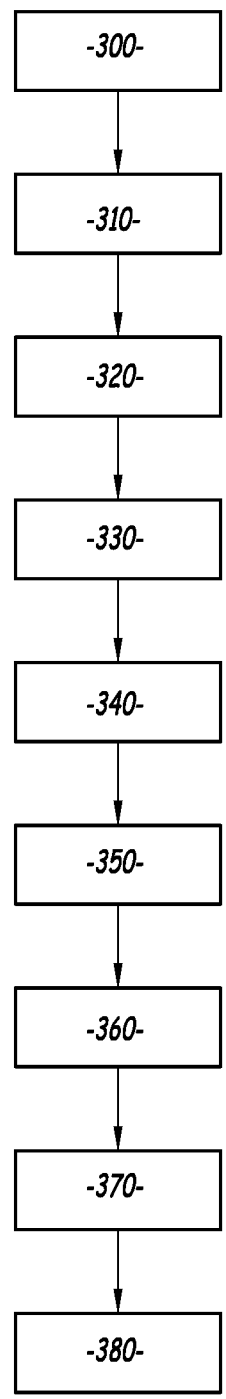

The invention will be better understood upon reading the description that follows, presented solely by way of non-limiting example and with reference to the appended drawings, in which:

FIG. 1 is a schematic representation of a switching device comprising a current interruption device and a system for controlling the triggering of a current interruption, FIG. 2 is a schematic representation of the architecture of the system for controlling the switching device, FIG. 3 is a block diagram of a configuration method for the switching device, and FIG. 4 is a block diagram of a method for diagnosing the nature of an electrical fault.

An electrical switching device 10, a mobile device 15 and a configuration device 20 are shown in FIG. 1.

The switching device 10 is configured for receiving an electrical current C from a first electrical conductor and for transmitting the current C to a second electrical conductor. The switching device 10 is furthermore configured for interrupting the passage of the electrical current C between the first and the second electrical conductors.

The switching device 10 is integrated into an electrical installation comprising at least one device consuming electricity. For example, the switching device 10 is interposed between a source of electrical energy and at least one device consuming electricity of the electrical installation. In this case, the switching device 10 is configured for receiving the electrical current C from the source of electrical energy and for supplying each device consuming electricity with the electrical current C. The electrical current C is, for example, one phase of a three-phase current.

An electric motor, such as a three-phase motor, is one example of a device consuming electricity.

The switching device 10 is configured for measuring a value of a first electrical quantity of the current C and for allowing or interrupting the passage of the current C depending on the measured value.

The switching device 10 comprises at least one input connection land 25, at least one output connection land 30, at least one switching member 35, a housing 40, a measurement device 45, an electrical power supply system 50 and a trigger module 55.

In FIG. 1, the trigger module 55, the measurement device 45 and the electrical power supply system 50 are accommodated in the housing 40 so as to form a triggering device, whereas the switching member 35 is integrated into a circuit breaker 56 distinct from the triggering device.

For example, the circuit breaker 56 comprises a housing 57 distinct from the housing 40 of the triggering device.

The term "distinct" is understood to mean that the housings 57 and 40 are able to be moved independently of one another. According to one embodiment, the housings 57 and 40 are able to be fixed to one another in a reversible manner. The housings 57 and 40 are therefore separable from one another. In FIG. 1, the housings 57 and 40 are shown fixed to one another.

According to one embodiment, the housings 57 and 40 are able to be remote from one another, in which case the circuit breaker 56 and the triggering device are connected to one another via wired electrical conductors in order to provide the passage of the current C between the input connection terminal 25 and the output connection terminal 30.

According to the example in FIG. 1, the switching device 10 comprises a single input connection land 25, a single output connection land 30 and a single switching member 35. It should be noted that the number of input connection lands 25, of output connection lands 30 and of switching members 35 is able to vary. For example, in one embodiment, the switching device 10 is a three-phase switching device comprising three input connection lands 25, three output connection lands 30 and three switching members 35. According to one variant, a single switching member 35 is common to all the input and output connection lands 25, 30.

The input connection land 25 is configured so as to be connected to the first conductor and for receiving the electrical current C from the first electrical conductor.

The output connection land 30 is configured so as to be connected to the second conductor and for transmitting the electrical current C to the second electrical conductor.

According to the example in FIG. 1, the input connection land 25 is a metal element passing through the wall of the housing 57 of the circuit breaker and configured so as to be, at one end, connected to the corresponding electrical conductor, the other end being accommodated within the housing 57 of the circuit breaker 56. As a variant, each connection land 25, 30 comprises an assembly of electrically-conductive elements connected to one another. For example, the output connection land 30 comprises an element 58 partially accommodated within the housing 40 and an element 59 partially accommodated within the housing 57.

The element 58 is an electrical conductor configured so as to be, at one end, connected to the corresponding electrical conductor and, at the other end, connected to the element 59. It should be noted that any type of electrical connection between the elements 58 and 59 may be envisaged.

The switching member 35 is mobile with respect to the housing 57 and to the input and output connection lands 25, 30 between a closed position and an open position. In FIG. 1, the connection mechanism 35 is shown in its open position.

When the switching member 35 is in the closed position, the switching member 35 allows the passage of the current C between the input and output connection lands 25, 30. In particular, the switching member 35 is electrically connected to the element 59 of the output connection land 30 and to one end of the input connection land 25.

When the switching member 35 is in the open position, the switching member 35 prevents the passage of the current C between the input and output connection lands 25, 30.

The switching member 35 is configured for switching between its open and closed positions.

For example, the switching member 35 is configured for switching between the open and closed positions depending on the measured values of the first quantity of the current C.

According to the example in FIG. 1, the switching member 35 comprises a connection element 60 and an actuator 65.

The connection element 60 is mobile with respect to the connection lands 25, 30 between a first position, shown in FIG. 1, and a second position. When the switching member 35 is in the closed position, the connection element 60 is in its first position and electrically connects the two input and output connection lands 25, 30.

When the switching member 35 is in the open position, the connection element 60 is in its second position and the two input and output connection lands 25, 30 are electrically disconnected from one another.

The connection element 60 is made from an electrically-conductive material.

The actuator 65 is configured to make the switching member 35 switch between the closed position and the open position. In particular, the actuator 65 is configured so as to move the connection element 60 between its first position and its second position.

The actuator 65 comprises, for example, a handle allowing an operator to manually move the switching member 35 between its two positions and magnetic elements configured for moving the switching member 35 from its closed position to its open position following the receipt of a command sent by the trigger module 55. In particular, the handle is configured to allow the operator to re-arm the switching device 10 by moving the switching member from its open position to its closed position.

The housing 40 is designed to electrically isolate the trigger module 55 and the measurement device 45 from the outside of the housing 40. The housing 40 is, for example, made of a plastic material.

The measurement device 45 is configured for measuring at least a first electrical quantity of the electrical current C.

A first quantity is, for example, an intensity of the electrical current C. A measurement device 45 comprising Rogowski coils is one example of a device for measuring an intensity. Rogowski coils are elements generating an electrical voltage proportional to the intensity of the electrical current flowing through a conductor surrounded by the coils. The electrical voltage thus generated is then measured and the measurement device 45 deduces from this a value of the intensity of the electrical current C.

According to one variant, another first quantity measured is a voltage of the electrical current C.

The electrical power supply system 50 is configured for electrically supplying the trigger module 55 and the actuator 65. In particular, the electrical power supply system 50 is configured for electrically supplying the trigger module 55 with a first electrical power supply current C1.

The electrical power supply system 50 is, for example, configured for generating the first electrical power supply current C1 from the electrical current C flowing through the switching device 10. According to one embodiment, the electrical power supply system 50 comprises a transformer configured for generating the first electrical power supply current C1 from the electrical current C flowing through the switching device 10. In FIG. 1, the transformer is integrated into the measurement device 45, for example accommodated within a common envelope electrically isolating the transformer and the measurement device 45 from the rest of the switching device 10.

The power supply system 50 comprises at least a first electrical circuit CE1 and a second electrical circuit CE2, distinct from each other. The term "distinct" is understood to mean that the power supply system 50 is configured for supplying at least one of the two electrical circuits CE1, CE2 independently of the other electrical circuit CE1, CE2.

The first electrical circuit CE1 has a first electrical voltage V1. The first electrical voltage V1 is in the range between 1 volt (V) and 10 V. For example, the first electrical voltage V1 is equal to 3 V.

The first electrical current C1 flows through the first electrical circuit CE1.

The first electrical circuit CE1 comprises, for example, a converter 67 configured for generating the first electrical current C1 from the voltage across the terminals of the transformer.

The second electrical circuit CE2 has a second electrical voltage V2. The second electrical voltage V2 is in the range between 1 volt (V) and 10 V. For example, the second electrical voltage V2 is equal to 3 V.

The second electrical circuit CE2 is designed to allow a second power supply current C2 to flow through it.

The second electrical circuit CE2 comprises, for example, a switch 68 designed to electrically connect the second electrical circuit CE2 to the first electrical circuit CE1. When the two electrical circuits CE1 and CE2 are electrically connected to one another, a part of the first power supply current C1 is sampled so as to form, in the second electrical circuit CE2, the second power supply current C2.

The trigger module 55 is configured for detecting an electrical fault and for controlling the switching of the switching member 35 from its closed position to its open position when the electrical fault is detected.

The term "electrical fault" is understood to mean an anomaly of the electrical installation causing a modification of the electrical current C.

A short-circuit is one example of an anomaly. A phase unbalance, a temporary over-consumption of a device consuming electricity, a blockage or too long a start-up phase of a rotor of an electric motor caused by friction or debris are other examples of anomalies.

The trigger module 55 is configured for detecting the electrical fault based on at least values of the first quantity measured by the measurement device 45 and on detection parameters P. The detection parameters P are parameters stored in the trigger module 55 allowing the detection of the electrical fault.

For example, a detection parameter P is a maximum value allowed for the intensity of the electrical current C. When the intensity of the electrical current C is greater than the maximum allowed intensity, an electrical fault such as a short-circuit is detected by the trigger module 55.

Maximum allowed variation rate for a first measured electrical quantity is another example of a detection parameter P.

Some anomalies are likely to present, in the electrical current C, a signature characteristic of the anomaly. For example, a progressive increase in the intensity of the electrical current C is able to cause a device that consumes electricity to heat up. The detection parameters P comprise, for example, at least one time slot. One example of a time slot comprises a predefined curve describing the variation of the first measured quantity as a function of time. When, over a predefined period, the time variation of the first measured quantity is similar to the predefined curve, the anomaly is detected.

The detection parameters P vary depending on the electrical installation to which the switching device 10 is connected.

The trigger module 55 comprises a first memory 70, a first driver module 75, a communications module 80 and a second driver module 85.

The various elements of the trigger module 55 are shown in FIG. 2, on which the connections between these elements and the power supply system 50 can be seen. In particular, arrows indicate the connections between the first and second electrical circuits CE1, CE2 and these elements.

The first memory 70 is a non-volatile memory. A non-volatile memory is a memory in which the stored data are conserved even in the absence of an electrical power supply.

The first memory 70 is, for example, an EEPROM. EEPROM memory stands for "Electrically-Erasable Programmable Read-Only Memory", also referred to as E2PROM or $E^2PROM$.

It should be noted that other types of non-volatile memories are able to be used.

The first memory 70 is configured for storing values, referred to as first values, of the detection parameters P.

The first memory 70 is designed to exchange information with the first driver module 75. For example, the first memory 70 and the first driver module 75 are connected to one another via a data transfer bus 90.

The first driver module 75 is configured for acquiring the detection parameters P in the first memory 70. The first driver module 75 is furthermore configured for writing data, such as new values of the detection parameters P, into the first memory 70.

The first driver module 75 is furthermore configured for receiving, from the measurement device 45, values of the first measured electrical quantity. For example, the first driver module 75 is connected to the measurement device 45 via an analogue or digital link 66.

The first driver module 75 is configured for detecting the electrical fault based on at least values of the measured first electrical quantity and on the detection parameters P.

The first driver module 75 is configured so as to be electrically powered by the first electrical circuit CE1. The first driver module 75 is configured for regulating the first power supply current C1, for example by action on the converter 67.

The first driver module 75 is configured for controlling the connection or the disconnection of the second electrical circuit CE2 by means of the switch 68. In particular, the first driver module 75 is configured for measuring a second electrical quantity of the first power supply current C1 and for controlling the supply of electrical power to the second driver module 85 when the second electrical quantity is greater than or equal to a threshold.

For example, the first driver module 75 is configured for controlling the connection of the second electrical circuit CE2 to the first electrical circuit CE1 when the second electrical quantity is greater than or equal to a threshold, and for controlling the disconnection of the two electrical circuits CE1, CE2 when the second electrical quantity is strictly less than the threshold.

The second electrical quantity is, for example, a power or an intensity of the first power supply current C1. In particular, if the power of the first power supply current C1 is less than the threshold, the first driver module 75 controls the supply of electrical power to the first electrical circuit CE1 but not the second electrical circuit CE2.

The first driver module 75 is furthermore configured for transmitting the switching signal to the actuator 65 when the electrical fault is detected.

The first driver module 75 is configured for exchanging information with the second driver module 85, for example through a connection bus 90. According to one embodiment, a buffer 95 is interposed between the two driver modules 75, 85. The buffer 95 is configured so as to be electrically powered by the first electrical circuit CE1.

The first driver module 75 is, for example, an ASIC. An ASIC (for "Application-Specific Integrated Circuit") is a specialized integrated circuit dedicated to a specific application.

It should be noted that other types of driver modules are able to be used. For example, according to one variant, the first driver module 75 is a programmable logic component. A programmable logic circuit, or programmable logic network, is an integrated logic circuit which can be re-programmed after its fabrication. According to another variant, the first driver module 75 is a data processing unit comprising a memory, a processor and a software application comprising code instructions recorded in the memory and executable by the processor.

The communications module 80 is a radiofrequency communications module. A radiofrequency communications module is a module configured for exchanging data via radiofrequency electromagnetic waves.

Radiofrequency electromagnetic waves are electromagnetic waves having a frequency in the range between 3 KiloHertz (KHz) and 3 GigaHertz (GHz).

As a variant, the communications module 80 is designed to emit or to receive an electromagnetic wave having a frequency higher than or equal to 13.553 MHz, and less than or equal to 13.567 MHz.

Preferably, the communications module 80 is designed to emit and to receive an electromagnetic wave having a frequency higher than or equal to 13.553 MHz, and less than or equal to 13.567 MHz.

Advantageously, the communications module 80 uses a near-field communications (or NFC) protocol. Near-field communications is a short-range, high-frequency, wireless communications technology allowing the exchange of information between peripheral devices up to a distance of around 10 centimetres (cm). NFC technology is an extension of the ISO/CEI 14443 standard.

The communications module 80 comprises an antenna 100 and a second memory 105.

The communications module 80 is configured for receiving, via radiofrequency communications, a configuration message comprising values, referred to as second values, of the detection parameters P. The communications module 80 is furthermore configured for storing the received second values in the second memory 105.

The communications module 80 is connected to the second driver module via a connection bus 90.

The communications module 80 is configured so as to be electrically powered by the second electrical circuit CE2.

The second memory 105 is a non-volatile memory, for example an EEPROM memory.

The second driver module 85 is a data processing unit comprising a third memory 110, a first processor 115 and a device for storing electrical energy 117. The third memory 110 contains software instructions which, when they are executed on the first processor 115, cause the implementation, by the second driver module 85, of steps of a method for configuring the switching device 10.

As a variant, the second driver module 85 is an ASIC, or else a programmable logic circuit.

The second driver module 85 is configured for replacing, in the first memory 70, the first values by the second values.

More precisely, the second driver module 85 is configured for acquiring, in the second memory 105, the second values of the detection parameters P and for transmitting the second values to the first driver module 75, and for controlling the substitution by the first driver module 75, in the first memory, of the first values of the detection parameters P by the second values.

According to one variant, the second driver module 85 is directly connected to the first memory 70 and, during the replacement, substitutes the second values for the first values in the first memory 70 without intervention of the first driver module 75.

The second driver module 85 is furthermore configured so as to be connected via a wired link 135 to the configuration device 20. The wired link comprises, for example, an asynchronous bus SPI. It should be noted that other types of wired links and of communications protocols are able to be used.

The device for storing electrical energy 117 is configured for generating a fourth electrical power supply current C4 designed to electrically power the second driver module 85. The device for storing electrical energy 117 is, for example, a capacitor or an assembly of capacitors.

The mobile device 15 is configured so as to be transported by an operator. For example, the mobile device 15 is a digital tablet. As a variant, the mobile device 15 is a mobile telephone, or potentially a specifically-designed electronic device.

The mobile device 15 comprises a first human-machine interface 120, a data processing unit 125 and a transfer module 130.

The first human-machine interface 120 comprises, for example, a touch screen.

The transfer module 130 is configured for communicating via radiofrequency communications with the communications module 80. The mobile device 15 is, in this case, a wireless device.

The configuration device 20 is, for example, a computer such as a portable computer (laptop). In FIG. 2, the switching device 20 is shown connected to the second driver module 85 of the switching device 10 via the wired link 135.

The operation of the switching device 10 will now be described with reference to FIGS. 3 and 4.

A block flow diagram comprising steps of one example of a method for configuring the switching device 10 by an operator with the aid of the mobile device 20 is shown in FIG. 3. It is assumed, in this example, that first values of the detection parameters P are stored in the first memory 70 prior to the implementation of the configuration method.

During a first step 200, the operator transmits to the mobile device 15, via the first human-machine interface 120, second values of the detection parameters P that the operator wishes to see adopted by the switching device 10.

For example, a device consuming electricity has been added or modified in the electrical installation and the detection parameters P must therefore be modified in order to take this modification into account.

During a second step 205, the transfer module 130 generates a configuration signal destined for the communications module 80. The configuration signal allows the transfer of energy between the transfer module 130 and the communications module 80. The antenna 100 generates, from the configuration signal, a third power supply current C3.

The third power supply current C3 electrically powers the second memory 105.

During a third step 210, the second values of the detection parameters P are transmitted, via the configuration signal, to the communications module 80. The configuration signal comprises, for example, the time of transmission of the second values. As a variant or as a complement, the configuration signal comprises one or more identifiers of the mobile device 15 and/or of the operator, and, for example, an associated password.

According to one embodiment, the configuration signal is an encrypted signal.

During a fourth step 215, the second memory 105 being powered by the third power supply current C3, the second values are written into the second memory 105. For example, second values already stored are substituted for the second values transmitted by the mobile device 15.

The date and the time at which the second values have been transmitted is, for example, also written into the second memory 105. As a variant or as a complement, a first flag indicating a modification of the second values is stored in the second memory 105. Where relevant, the identifier or identifiers and/or the associated password are stored in the second memory 105.

The term "flag" is understood to mean information, such as one or more values of one or more predefined bits of information, intended to be interpreted by a controller in order to provide contextual information. For example, a bit is equal to "1" if the second values have been modified and "0" otherwise is one example of a flag.

The configuration signal is then turned off by the mobile device 15.

Two alternatives are possible after the end of the fourth step 215. This is shown by a test step 220 in FIG. 3.

If the second driver module 85 is electrically powered, the fourth step 215 is followed by a fifth step 225.

If the second driver module 85 is not powered by the second power supply current C2—for example if the electrical power supplied by the converter 67 is insufficient for simultaneously supplying the two driver modules 75, 85—the second values remain stored in the second memory 105 in the absence of the configuration signal and of the third power supply current C3, but are not processed for as long as the second driver module 85 is not powered. This is shown in FIG. 3 by an arrow 230.

According to one example, during the steps 200 to 215, the second electrical quantity is strictly less than the corresponding threshold and the first driver module 75 does not control the supply of electrical power to the second driver module 85. The fifth step 225 is not therefore implemented. The switching device therefore implements a step 230 waiting for the second electrical quantity, for example the electrical power for the first electrical power supply current C1, to be sufficient to allow the supply of power to the second driver module 85.

When the second electrical quantity becomes greater than or equal to the threshold, the first driver module 75 controls the supply of power to the second driver module 85 with the second power supply current C2 is then implemented.

During the fifth step 225, the second driver module 85 acquires the second stored values in the second memory 105. The second values are then written into the third memory 110 of the second driver module 85. The time of receipt of the second values and/or the identifier or identifiers and/or the password are also acquired by the second driver module 85.

For example, the second driver module 85 periodically verifies whether second values of the detection parameters P have been written into the second memory 105 since the last verification.

According to one embodiment, following the recovery of the supply of electrical power to the second driver module 85 after a period of time during which the second driver module 85 was not electrically powered, the second driver module 85 consults the second memory 105 and verifies whether second values have been written into the second memory 105 during the period during which the second driver module 85 was not powered.

The fifth step 225 is followed by a sixth step 235.

It should be noted that, as a variant, the operator is able to transmit new values of the detection parameters P by means of the configuration device 20. The values of the detection parameters P that the operator tries to transmit are then referred to as third values.

The steps 200 to 215 are then replaced by a single seventh step 240 during which the third values are transmitted to the second driver module 85 via the wired link. Where relevant, the identifier or identifiers and/or the associated password are also transmitted.

Preferably, when the switching device 10 is connected to the configuration device 20 via the wired link 135, the configuration device 20 electrically powers the two driver modules 75 and 85. The seventh step 240 is therefore immediately followed by the fifth step 225.

During the fifth step 225, the third data values are stored in the third memory 110.

The fifth step 225 is followed by the sixth step, in the case where second values are transmitted by the mobile device 15 and in the case where third values are transmitted by the configuration device 20.

During the sixth step 235, the second driver module 85 verifies the validity of the second or received third values. For example, ranges of values allowed for the detection parameters P are stored in the third memory 110, and the first processor 115 compares the second or received third values with the ranges of allowed values.

If the received second or third values belong to a range of allowed values, the second driver module 85 validates the received second or third values. Otherwise, the second driver module 85 does not validate the received second or third values.

As an optional complement, the second driver module 85 also verifies the identifier or identifiers and/or the password, for example, by comparing them with a list of identifiers and/or of authorized passwords. If the identifier does not belong to the list of authorized identifiers, the second or third values are not validated.

If the configuration signal is an encrypted signal, the second driver module 85 decrypts the second or third values prior to validating them.

If the non-validated values are second values, during an eighth step 245, the second driver module 85 writes a second flag into the second memory 105 indicating that the second values are not validated. The second flag is substituted for the first flag. For example, the mobile device 15 is designed to interrogate the communications module 80, via radiofrequency communications, in order to determine whether the second flag is present and, in this case, to indicate to the operator that the second values have not been taken into account.

If the non-validated values are third values, the second driver module 85 transmits the second flag to the configuration device 20 by means of the wired link 135 during a ninth step 250.

If the second or third values are validated, the sixth step 235 is followed by a tenth step 255. During the tenth step 255, the second driver module 85 verifies whether the first driver module 75 is electrically powered.

If the first driver module 75 is not powered, the second driver module 85 waits for the first driver module 75 to be powered. This is represented by an arrow 260 in FIG. 3.

If the first driver module 75 is electrically powered, two options are possible. This is shown in FIG. 3 by a test step 265.

If the values received by the second driver module 85 are second values transmitted via radiofrequency communications, the test step 265 is followed by an eleventh step 270 and by a twelfth step 275.

During the eleventh step 270, the second driver module 85 transmits the second values to the first driver module 75 and controls the substitution of the second values for the first values.

During the twelfth step 275, the second values are substituted by the first driver module 75, in the first memory 70, for the first values.

If the values received by the second driver module 85 are third values transmitted via a wired link, the second driver module 85 replaces, in the first memory 70 and/or in the second memory 105, the first values and/or the second values by the third values. In particular, the substitution of the first values in the first memory 70 is effected by the first driver module 75 upon a command from the second driver module 85.

For example, the test step 265 is followed by a thirteenth step 280, by a fourteenth step 285 and by a fifteenth step 290.

During the thirteenth step 280, the second driver module 85 substitutes the second values, in the second memory 105, by the third values. The first flag is also written into the second memory 105 in order to indicate that the second values have been modified.

During the fourteenth step 285, the second driver module 85 transmits the third values to the first driver module 75 and controls the substitution of the third values or the first values.

During the fifteenth step 290, the first values are substituted by the first driver module 75, in the first memory 70, by the third values.

Thus, at the end of the configuration method, the values of the detection parameters P that the first driver module 75 uses for detecting electrical faults are modified by the operator, by means either of the mobile device 15 or of the configuration device 20.

A flow diagram of the steps of a method for diagnosing the nature of an electrical fault is shown in FIG. 4.

The diagnostic method comprises a configuration step 300, a detection step 310, a transmission step 320, a current interruption step 330, a signalling step 340, a storage step 350, a power supply step 360, a transfer step 370 and a display step 380.

During the configuration step 300, the configuration method previously described is implemented. In particular, the first values are modified in the first memory 70, and the first flag has been written into the second memory 105. The switching member 35 is in its closed position and the electrical current C therefore flows between the two connection terminals 25, 30. The first electrical circuit CE1 and the second electrical circuit are respectively powered by the first power supply current C1 and by the second power supply current C2, which are generated by the converter 67 starting from the electrical current C.

During the detection step 310, an electrical fault occurs and is detected by the first driver module 75.

During the transmission step 320, the first driver module 75 generates the switching signal and transmits it to the actuator 65.

The first driver module 75 also transmits to the second driver module 85 an alarm signal. The alarm signal is provided to warn the second driver module 85 that the supply of electrical power to the second driver module 85 will soon cease.

Furthermore, the first driver module generates data identifying the electrical fault. The data identifying the electrical fault comprises, for example, a digital code indicating the type of fault detected and a detection timestamp of the fault.

Having received the alarm signal, the device for storing electrical energy 117 generates the fourth power supply current C4. The fourth current C4 is provided for powering the second driver module 85 during the current interruption 330, warning 340 and storage 350 steps.

During the current interruption step 330, the actuator 65 disconnects the connection element 60 from the connection terminals 25, 30. The electrical current C therefore ceases to flow, as do the first and second power supply currents C1 and C2. However, the second driver module 85 remains electrically powered by the fourth power supply current C4.

During the signalling step 340, the data identifying the electrical fault is transmitted to the second driver module 85. For example, the data identifying the electrical fault is written into a register of the first driver module 75, and the second driver module 85 acquires the identification data in the third memory 110 after having received the alarm message.

As a variant, a message containing the data identifying the electrical fault is transmitted to the second driver module 85.

During the storage step 350, the data identifying the electrical fault is written, by the second driver module 85, into the third memory 110. The device for storing electrical energy 117 then ceases to generate the fourth power supply current C4.

During the power supply step 360, the operator approaches the mobile device 15 of the switching device 10. Upon a command by the operator, the transfer module 130 emits a radiofrequency diagnostic signal. The diagnostic signal causes the generation, by the antenna 100, of the third power supply current C3. The communications module 80 is therefore electrically powered by the third power supply current C3.

During the transfer step 370, the communications module 80 emits an identification signal destined for the transfer module 130. The identification signal comprises the data identifying the electrical fault stored in the second memory 105.

If the first flag is present in the second memory 105, the identification signal also comprises the second values.

During the display step 380, the first human-machine interface 120 then indicates to the operator the nature of the fault having caused the switching of the electrical switching device 10.

By virtue of the presence of two driver modules 75, 85, the first driver module 75 is only responsible for safety (fault detection and switching control) and is therefore able to have a simple architecture and a low electrical consumption. The second driver module 85, responsible for the other functionalities, is only powered when the electrical power available is sufficient. Thus, although the switching device 10 has functionalities going further than the simple safety aspects of the electrical installation, the switching device 10 is designed to render an electrical installation safe in an efficient manner even if the electrical power available is very low, since only the first driver module 75 is then powered.

Furthermore, the second driver module 85 allows the verification of the conformity of the received values of detection parameters, in particular their inclusion within a range of allowed values. Thus, the risk of an operator transmitting values not allowing an efficient detection of faults is limited. In addition, the validation of the data received by decryption and/or by virtue of an identifier prevents any unauthorized person from modifying the configuration of the switching device 10. The switching device 10 is therefore, here again, rendered more secure.

The transmission of the data identifying the fault and their storage in the memory 105 of the communications module 80 allows the fault to be readily diagnosed even if the switching device 10 is not powered. This fault is therefore more readily corrected, and the switching device is, once again, rendered more secure.

The buffer 95 prevents current leakages from the first driver module 75 to the second driver module 85 when only the first driver module 75 is electrically powered.

The electrical circuits CE1, CE2 have been described in one embodiment in which these circuits CE1, CE2 are separated from the trigger module 55. It should be noted that these circuits CE1, CE2 are able to be, at least partially, integrated into the trigger module 55.

Furthermore, the switching device 10 has been described hereinabove in the form of a circuit breaker 56 and of a triggering device separated from one another. It should be noted that the switching device 10 is able to take the form of a single device, comprising for example a single housing.

The invention claimed is:

1. An electrical switching device comprising at least two connection lands, a measurement device configured for measuring a first electrical quantity of an electrical current flowing between the two connection lands, an electrical power supply system designed to deliver a first electrical power supply current, a trigger module and a switching member designed to switch between a first position electrically connecting the two connection lands and a second position wherein the two connection lands are electrically disconnected from one another, the trigger module comprising:

a first memory for storing first values of detection parameters,
   a first driver module configured for detecting an electrical fault as a function at least of values measured by the measurement device and of the first stored values and for generating, in response, a switching signal for the switching member, and
   a communications module comprising a second memory which is non-volatile, the communications module being configured for receiving, via radiofrequency communications, a configuration signal containing second values of the detection parameters and for storing the second values received in the second memory,
   wherein the trigger module further comprises a second driver module configured for replacing, in the first memory, the first values by the second values, and
   wherein the first driver module is configured for comparing a second electrical quantity of the first electrical power supply current with a threshold and for controlling the supply of electrical power to the second driver module if the second electrical quantity is greater than or equal to the threshold, and
   if the second electrical quantity is strictly less than the threshold, there is an absence of supply of electrical power to the second driver module and the first driver module is configured to wait for the second electrical quantity to be greater than the threshold.

2. The electrical switching device according to claim 1, wherein the first memory is a non-volatile memory.

3. The electrical switching device according to claim 2, wherein the second driver module is configured for comparing the second values stored in the second memory with at least one range of allowed values, and for substituting, in the first memory, the second values for the first values only if the second values belong to a range of allowed values.

4. The electrical switching device according to claim 1, wherein the first driver module is configured for, following the detection of a fault, transmitting to the second driver module identification data identifying the fault detected, the second driver module being configured for writing the identification data into the second memory.

5. The electrical switching device according to claim 4, wherein the first driver module is configured for, following the detection of a fault, transmitting to the second driver module an alarm signal warning that an interruption of the electrical power supply to the second driver module will take place, the second driver module comprising a device for storing electrical energy configured for electrically supplying the second driver module starting from the reception of the alarm signal until the writing of the identification data in the second memory.

6. The electrical switching device according to claim 1, wherein the communications module is configured for generating, starting from the configuration signal, a second current for supplying electrical power to the communications module.

7. The electrical switching device according to claim 1, wherein the second driver module is configured for, following the recovery of the electrical power supply to the second driver module after a period of time during which the second driver module was not electrically powered:
   consulting the second memory, and
   if second parameter values have been stored in the second memory for the period of time during which the second driver module was not powered, replacing, in the first memory, the first values by the second values.

8. The electrical switching device according to claim 1, wherein the second driver module is further configured for receiving, via a wired link, third values of the detection parameters coming from a configuration device distinct from the electrical switching device and for replacing, in the first memory and/or in the second memory, the first values and/or the second values by the received third values.

9. The electrical switching device according to claim 1, wherein the electrical power supply system comprises current transformers designed to generate the first electrical current starting from at least one electrical current flowing between the two connection lands.

10. An electrical switching device comprising at least two connection lands, a measurement device configured for measuring a first electrical quantity of an electrical current flowing between the two connection lands, an electrical power supply system designed to deliver a first electrical power supply current, a trigger module and a switching member designed to switch between a first position electrically connecting the two connection lands and a second position wherein the two connection lands are electrically disconnected from one another, the trigger module comprising:
- a first memory for storing first values of detection parameters,
- a first driver module configured for detecting an electrical fault as a function at least of values measured by the measurement device and of the first stored values and for generating, in response, a switching signal for the switching member, and
- a communications module comprising a second memory which is non-volatile, the communications module being configured for receiving, via radiofrequency communications, a configuration signal containing second values of the detection parameters and for storing the second values received in the second memory, wherein the trigger module further comprises a second driver module configured for replacing, in the first memory, the first values by the second values, and wherein the first driver module is configured for comparing a second electrical quantity of the first electrical power supply current with a threshold and for controlling the supply of electrical power to the second driver module if the second electrical quantity is greater than or equal to the threshold, the electrical switching device further comprising a triggering device and a circuit breaker, the triggering device comprising a housing accommodating the trigger module, the circuit breaker comprising a housing accommodating the switching member, the housings of the triggering device and of the circuit breaker being distinct from one another.

11. A method for configuring a switching device comprising at least two connection lands, a measurement device configured for measuring an electrical quantity of an electrical current flowing between the two connection lands, an electrical power supply system designed to deliver a first electrical power supply current, a trigger module and a switching member designed to switch between a first position electrically connecting the two connection lands and a second position wherein the two connection lands are electrically disconnected from one another, the trigger module comprising:
- a first memory wherein first values of detection parameters are stored,
- a first driver module configured for detecting an electrical fault as a function at least of values measured by the measurement device and of the first stored values and for generating, in response, a switching signal for the switching member,
- a communications module comprising a second memory which is non-volatile, and
- a second driver module, the method comprising steps of:
- receiving second values of the detection parameters, via radiofrequency communications, by the communications module,
- storing the second values in the second memory,
- comparing, by the first driver module, a second electrical quantity of the first electrical power supply current with a threshold, and
- if the second electrical quantity is greater than or equal to the threshold, controlling, by the first driver module, the supply of electrical power to the second driver module and replacing, in the first memory, by the second driver module, the first values by the second values, wherein, if the second electrical quantity is strictly less than the threshold, there is an absence of supply of electrical power to the second driver module and the first driver module waits for the second electrical quantity to be greater than the threshold.

12. The configuration method according to claim 11, further comprising steps of:
- receiving, by the second driver module, via a wired link third values of the detection parameters,
- replacing, in the second memory, the second values by the third values, and
- replacing, in the first memory the first values by the third values.

13. The configuration method according to claim 11, further comprising a step of comparing, by the second driver module, the second values stored in the second memory with at least one range of allowed values, the step of replacing, in the first memory, by the second driver module, the first values by the second values being implemented only if the second values belong to a range of allowed values.

14. The method for diagnosing the nature of an electrical fault, comprising steps of:
- implementing a configuration method according to claim 11,
- detecting, by the first driver module, an electrical fault,
- controlling, by the first driver module an interruption, by the switching member, of the electrical current flowing between the two connection lands,
- generating, by the first driver module, identification data identifying the electrical fault,
- transmitting the identification data to the second driver module, and
- writing, into the second memory, the identification data, and
- emitting, by the communications module, a radiofrequency identification signal comprising the identification data.

15. A method for diagnosing the nature of an electrical fault according to claim 14, further comprising a step of emitting, by a mobile device, a radiofrequency signal causing the generation, by an antenna of the communications module, an electrical power supply current for the communications module.

16. The method for diagnosing the nature of an electrical fault according to claim 14, wherein the second driver module is electrically powered, during the steps for the interruption, for transmitting the identification data and for writing, by an electrical current generated by a device for storing electrical energy.

* * * * *